United States Patent
Niizuma et al.

(10) Patent No.: US 12,153,011 B2
(45) Date of Patent: Nov. 26, 2024

(54) GAS SENSOR

(71) Applicant: NGK INSULATORS, LTD., Nagoya (JP)

(72) Inventors: Shotaro Niizuma, Kasugai (JP); Yusuke Watanabe, Nagoya (JP); Toshihiro Hirakawa, Kasugai (JP); Hayami Aota, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 65 days.

(21) Appl. No.: 17/882,889

(22) Filed: Aug. 8, 2022

(65) Prior Publication Data
US 2022/0373503 A1    Nov. 24, 2022

Related U.S. Application Data

(63) Continuation of application No. PCT/JP2021/004602, filed on Feb. 8, 2021.

(30) Foreign Application Priority Data

Feb. 12, 2020   (JP) ................................ 2020-021152

(51) Int. Cl.
*G01N 27/406*    (2006.01)
*G01N 27/407*    (2006.01)

(52) U.S. Cl.
CPC ....... *G01N 27/4062* (2013.01); *G01N 27/407* (2013.01)

(58) Field of Classification Search
CPC ........................ G01N 27/4062; G01N 27/407
See application file for complete search history.

(56) References Cited

U.S. PATENT DOCUMENTS

2007/0096615 A1*  5/2007  Matsuo .............. G01N 27/4077
                                                              313/143
2008/0067067 A1*  3/2008  Oya ..................... G01N 27/419
                                                              204/426

(Continued)

FOREIGN PATENT DOCUMENTS

JP          2001-141689 A       5/2001
JP          2004239725 A   *    8/2004

(Continued)

OTHER PUBLICATIONS

Ishikawa et al., English translation of JP-2004239725-A, 2004 (Year: 2004).*

(Continued)

*Primary Examiner* — Luan V Van
*Assistant Examiner* — Shizhi Qian
(74) *Attorney, Agent, or Firm* — MATTINGLY & MALUR, PC

(57) ABSTRACT

A gas sensor has a sensor element, first element pads, second element pads, first contact-point members, and second contact-point members. The sensor element has first and second surfaces that are positioned on opposite sides in a first direction. The first element pads are disposed on the first surface. The second element pads are disposed on the second surface in a quantity greater than that of the first element pads. The first and second contact-point members are connected to the first and second element pads, respectively. The width (Wt) of at least one of the second contact-point members is less than the widths (Wa-Wd) of the rest of the first and second contact-point members.

4 Claims, 8 Drawing Sheets

(56) References Cited

U.S. PATENT DOCUMENTS

| | | | |
|---|---|---|---|
| 2009/0126456 A1* | 5/2009 | Matsuo | G01N 27/4077 73/23.31 |
| 2014/0298931 A1* | 10/2014 | Oba | H01R 11/01 73/866.5 |
| 2021/0080421 A1 | 3/2021 | Niizuma et al. | |

FOREIGN PATENT DOCUMENTS

| | | | |
|---|---|---|---|
| JP | 2007003216 A | * | 1/2007 |
| JP | 2007047075 A | * | 2/2007 |
| JP | 2014-202663 A | | 10/2014 |
| JP | 2021-047028 A | | 3/2021 |

OTHER PUBLICATIONS

International Search Report of PCT/JP2021/004602 dated Apr. 20, 2021.

International Preliminary Report on Patentability received in corresponding International Application No. PCT/JP2021/004602 dated Aug. 25, 2022.

* cited by examiner

FIG. 7

[TABLE 1]

| LEVEL | SHIFTING IN POSITION | RATIO OF WIDTH R1 [%] =Wt/Wa | RATIO OF WIDTH R2 [%] =Wt/W | DETERMINATION |
|---|---|---|---|---|
| 1 | NONE | 100 | 30.3 | C |
| 2 | NONE | 90 | 27.3 | B |
| 3 | NONE | 80 | 24.2 | B |
| 4 | NONE | 70 | 21.2 | A |
| 5 | NONE | 60 | 18.2 | A |
| 6 | NONE | 50 | 15.2 | A |
| 7 | NONE | 45 | 13.6 | B |
| 8 | NONE | 40 | 12.1 | B |
| 9 | NONE | 35 | 10.6 | C |
| 10 | NONE | 30 | 9.1 | C |

FIG. 8

[TABLE 2]

| LEVEL | SHIFTING IN POSITION | RATIO OF WIDTH R1[%] =Wt/Wa | RATIO OF WIDTH R2[%] =Wt/W | DETERMINATION |
|---|---|---|---|---|
| 1 | PRESENT | 100 | 30.3 | C |
| 2 | PRESENT | 90 | 27.3 | A |
| 3 | PRESENT | 80 | 24.2 | A |
| 4 | PRESENT | 70 | 21.2 | A |
| 5 | PRESENT | 60 | 18.2 | A |
| 6 | PRESENT | 50 | 15.2 | A |
| 7 | PRESENT | 45 | 13.6 | A |
| 8 | PRESENT | 40 | 12.1 | A |
| 9 | PRESENT | 35 | 10.6 | B |
| 10 | PRESENT | 30 | 9.1 | C |

GAS SENSOR

CROSS-REFERENCE TO RELATED APPLICATIONS

This application is a Continuation of International Application No. PCT/JP2021/004602 filed on Feb. 8, 2021, which is based upon and claims the benefit of priority from Japanese Patent Application No. 2020-021152 filed on Feb. 12, 2020, the contents of which are incorporated herein by reference.

TECHNICAL FIELD

The present invention relates to a gas sensor that measures the concentration of a gas.

BACKGROUND ART

In JP 2001-141689 A, a problem is addressed of providing a gas sensor in which it is unlikely for short-circuiting of lead wires and metal terminal fixtures or the like to occur, and which produces a stable sensor output.

In order to solve the aforementioned problem, in JP 2001-141689 A, a first guide member 531 is disposed on a distal end side of each of first insertion holes in an elastic insulating member 5, and a second guide member 331 is disposed on a proximal end side of each of second insertion holes in an insulator 3, and movement of a lead wire 161 and a metallic terminal 49 is restricted by the first guide member 531 and the second guide member 331.

SUMMARY OF THE INVENTION

In the gas sensor described in the aforementioned patent publication, the plurality of contact-point members (female contact-point members) that are in direct contact with a sensor element so as to enable conduction have the same width and the same contact area.

In this instance, because the contact-point members are arranged above and below the sensor element, if the number of contact-point members differs between the upper and lower contact-point members, a difference occurs in the contact area between the sensor element and the upper and lower contact-point members. In this case, a difference may be generated in the stresses applied to the sensor element, and there is a possibility that the sensor element may become chipped or broken, resulting in poor conductivity between the sensor element and the contact-point members.

The present invention has been devised while taking into consideration the aforementioned problems, and has the object of providing a gas sensor which is capable of preventing poor conductivity between a sensor element and contact-point members.

A gas sensor according to one aspect of the present invention is equipped with a sensor element, a plurality of first element pads, a plurality of second element pads, a plurality of first contact-point members, and a plurality of second contact-point members. The sensor element includes a first surface and a second surface configured to face each other in a first direction. The plurality of first element pads are arranged on the first surface of the sensor element. The plurality of second element pads are arranged on the second surface of the sensor element, and are greater in number than the plurality of first element pads. The plurality of first contact-point members are connected respectively to the plurality of first element pads. The plurality of second contact-point members are connected respectively to the plurality of second element pads, and are greater in number than the plurality of first contact-point members. A width of at least one second contact-point member among the plurality of second contact-point members is smaller than a width of other ones of the first and second contact-point members.

According to the present invention, it is possible to prevent poor conductivity from occurring between the sensor element and the contact-point members.

BRIEF DESCRIPTION OF THE DRAWINGS

FIG. 7 is a table (Table 1) in which determination results are shown; and

FIG. 8 is a table (Table 2) in which determination results are shown.

DESCRIPTION OF THE INVENTION

A gas sensor according to the present invention will be presented and described in detail below with reference to the accompanying drawings.

Figure 1:
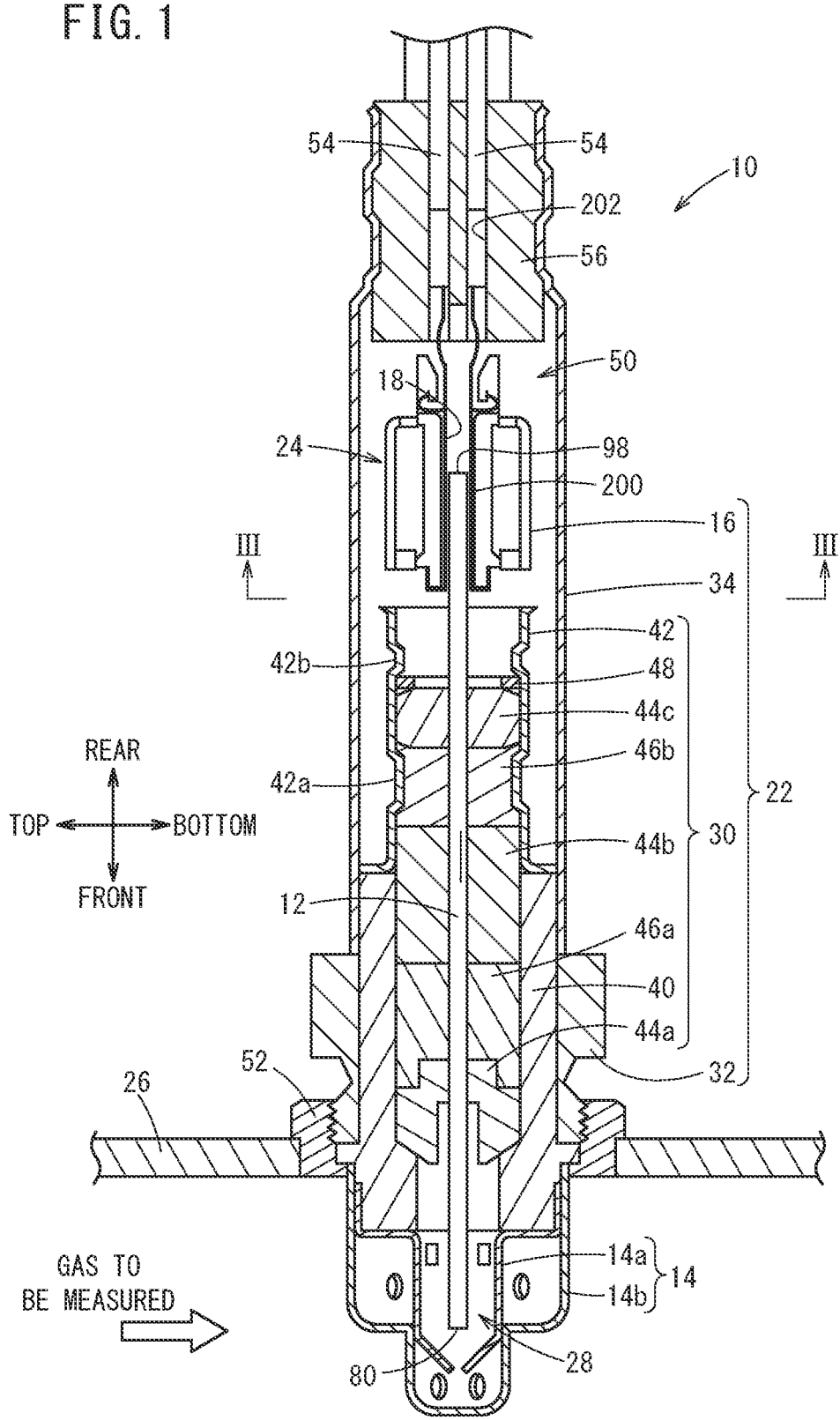
FIG. 1 is a cross-sectional view showing a gas sensor according to a present embodiment.
Figure 2:
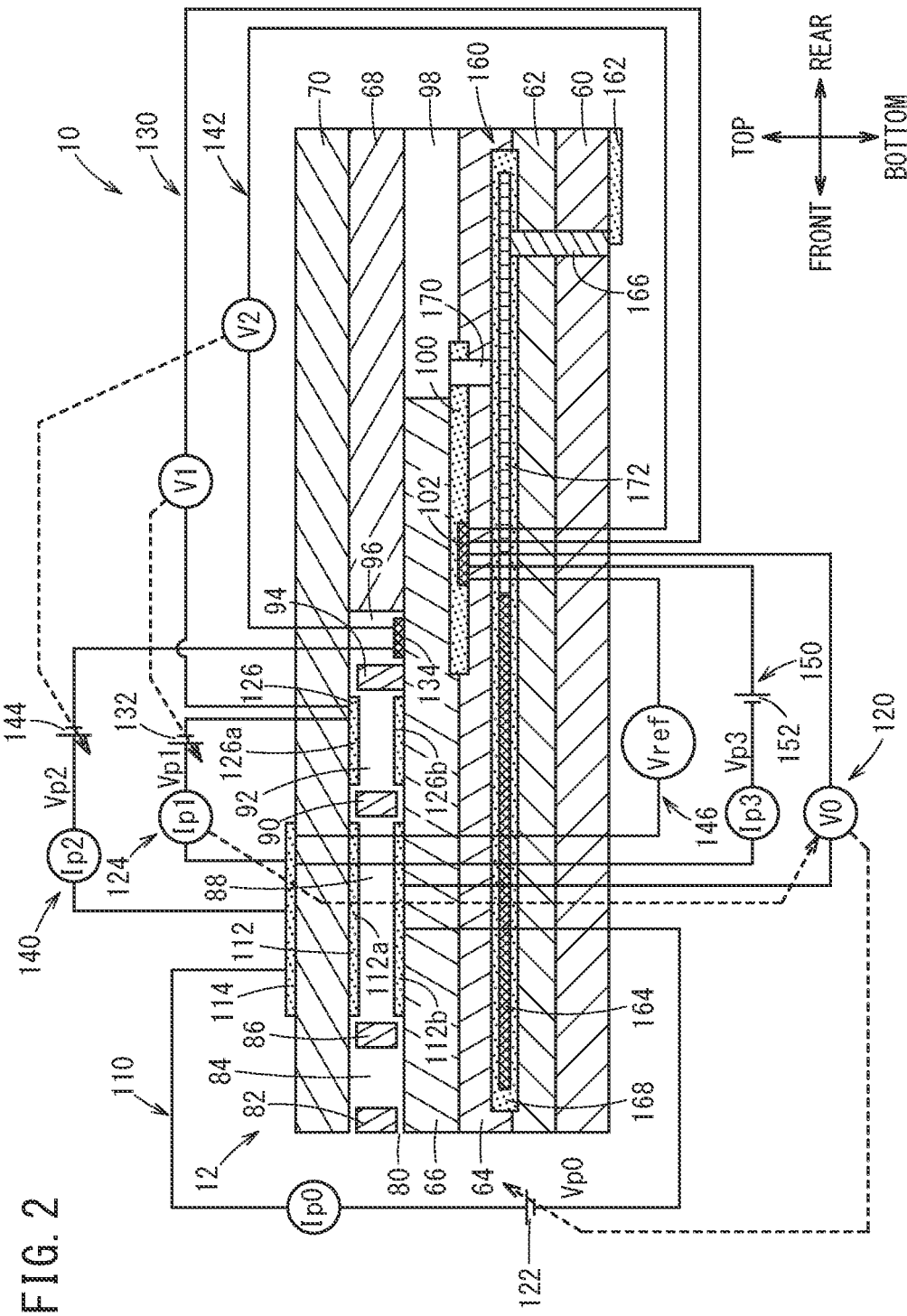
FIG. 2 is a schematic cross-sectional view schematically showing an example of the configuration of a sensor element.

As shown in FIG. 1, a gas sensor 10 according to the present embodiment is equipped with a sensor element 12. The sensor element 12 is of an elongate rectangular body shape, the longitudinal direction of the sensor element 12 (the horizontal direction as shown in FIG. 2) is defined as a front/rear direction (an example of a second direction, to be described later, in which the sensor element 12 extends), and the thickness direction of the sensor element 12 (the vertical direction as shown in FIG. 2) is defined as an upper/lower direction (an example of a first direction, to be described later, in which first and second surfaces face one another). Further, the widthwise direction of the sensor element 12 (a direction perpendicular to the front/rear direction and the upper/lower direction) is defined as a left/right direction (an example of a third direction, to be described later, in which a plurality of second contact-point members are arranged alongside one another).

As shown in FIG. 1, the gas sensor 10 is equipped with the sensor element 12, a protective cover 14 for protecting a front end side of the sensor element 12, and a sensor assembly 22 including a ceramic housing 16. The ceramic housing 16 retains a rear end portion of the sensor element 12, and functions as a connector 24 when terminal members 18 that are electrically connected to the sensor element 12 are installed therein.

As shown in the figure, the gas sensor 10 is attached to a pipe 26 such as the exhaust gas pipe of a vehicle, and is used in order to measure the concentration of a specified gas such as NOx or $O_2$ contained in the exhaust gas which serves as a gas to be measured.

The protective cover 14 includes a bottomed tubular inner side protective cover 14a that covers the front end of the sensor element 12, and a bottomed tubular outer side protective cover 14b that covers the inner side protective cover 14a. The inner side protective cover 14a and the outer side protective cover 14b are formed with a plurality of holes therein for allowing the gas to be measured to flow into the protective cover 14. A sensor element chamber 28 is formed as a space surrounded by the inner side protective cover 14a, and the front end of the sensor element 12 is arranged inside the sensor element chamber 28.

The sensor assembly 22 is equipped with an element sealing body 30 for sealing and fixing the sensor element 12, a nut 32 attached to the element sealing body 30, an outer cylinder 34, and the connector 24 that is in contact and is electrically connected to non-illustrated electrodes which are formed on surfaces (upper and lower surfaces) on the rear end of the sensor element 12.

The element sealing body 30 is equipped with: a tubular shaped main metal fitting 40; a tubular shaped inner cylinder 42 that is welded and fixed coaxially with the main metal fitting 40; and ceramic supporters 44a to 44c, green compacts 46a and 46b, and a metal ring 48, which are enclosed in a through hole on an inner side of the main metal fitting 40 and the inner cylinder 42. The sensor element 12 is positioned on the central axis of the element sealing body 30, and penetrates through the element sealing body 30 in the front/rear direction. Further, a reduced diameter portion 42a for pressing the green compact 46b in a central axial direction of the inner cylinder 42, and a reduced diameter portion 42b for pressing the ceramic supporters 44a to 44c and the green compacts 46a and 46b in a frontward direction via the metal ring 48 are formed on the inner cylinder 42. By the pressing force from the reduced diameter portions 42a and 42b, the green compacts 46a and 46b are compressed between the main metal fitting 40 and the inner cylinder 42, and the sensor element 12, whereby the green compacts 46a and 46b provide sealing between the sensor element chamber 28 inside the protective cover 14 and a space 50 inside the outer cylinder 34, and fix the sensor element 12 in place.

The nut 32 is fixed coaxially with the main metal fitting 40, and a male threaded portion is formed on the outer circumferential surface thereof. The male threaded portion of the nut 32 is inserted into a fixing member 52 which is welded to the pipe 26 and is provided with a female threaded portion on the inner circumferential surface thereof. Consequently, the gas sensor 10 is fixed to the pipe 26, in a state with the front end of the sensor element 12 and a portion of the protective cover 14 of the gas sensor 10 protruding into the pipe 26.

The outer cylinder 34 covers the periphery of the inner cylinder 42, the sensor element 12, and the connector 24, and a plurality of lead wires 54, which are connected to the connector 24, are drawn out from the rear end thereof. The lead wires 54 are electrically connected to respective electrodes (to be described later) of the sensor element 12 via the connector 24. A gap between the outer cylinder 34 and the lead wires 54 is sealed by an elastic insulating member 56 constituted by a grommet or the like. The space 50 inside the outer cylinder 34 is filled with a reference gas (an atmospheric gas according to the present embodiment). The rear end of the sensor element 12 is arranged in this space 50.

On the other hand, as shown in FIG. 2, the sensor element 12 is an element including a stacked body in which six layers of a first substrate layer 60, a second substrate layer 62, a third substrate layer 64, a first solid electrolyte layer 66, a spacer layer 68, and a second solid electrolyte layer 70, which are made up respectively from an oxygen ion conductive solid electrolyte layer such as zirconia ($ZrO_2$), are stacked in this order from a lower side as viewed in the drawing. Further, the solid electrolyte that forms these six layers is dense and airtight. For example, the sensor element 12 is manufactured by performing a predetermined process, printing of circuit patterns or the like, on ceramic green sheets corresponding to the respective layers, and then laminating the ceramic green sheets, and furthermore, firing and integrating the respective ceramic green sheets.

A gas introduction port 80, a first diffusion rate control member 82, a buffer space 84, a second diffusion rate control member 86, a first internal cavity 88, a third diffusion rate control member 90, a second internal cavity 92, a fourth diffusion rate control member 94, and a third internal cavity 96 are formed adjacent to each other in this order so as to communicate with each other, at one end of the sensor element 12 (the left side in FIG. 2) between the lower surface of the second solid electrolyte layer 70 and the upper surface of the first solid electrolyte layer 66.

The gas introduction port 80, the buffer space 84, the first internal cavity 88, the second internal cavity 92, and the third internal cavity 96 are spaces inside the sensor element 12 which are provided by way of hollowing out the spacer layer 68 and in which the upper portions thereof are defined by the lower surface of the second solid electrolyte layer 70, the lower portions thereof are defined by the upper surface of the first solid electrolyte layer 66, and the side portions thereof are defined by the side surfaces of the spacer layer 68.

Each of the first diffusion rate control member 82, the second diffusion rate control member 86, and the third diffusion rate control member 90 is provided as two horizontally elongated slits (in which openings thereof have a longitudinal direction in a direction perpendicular to the drawing). Further, the fourth diffusion rate control member 94 is provided as a single horizontally elongated slit (in which the opening thereof has a longitudinal direction in a direction perpendicular to the drawing) formed as a gap under the lower surface of the second solid electrolyte layer 70. The portion from the gas introduction port 80 to the third internal cavity 96 is also referred to as a gas-to-be-measured flow through section.

Further, at a position more distant from one end side than the gas-to-be-measured flow through section, and between the upper surface of the third substrate layer 64 and the lower surface of the spacer layer 68, a reference gas introduction space 98 is provided at a position where the side portions thereof are defined by the side surfaces of the first solid electrolyte layer 66. For example, the atmospheric gas (the atmosphere inside the space 50 shown in FIG. 1) is introduced into the reference gas introduction space 98 as a reference gas when measurement of the NOx concentration is performed.

An atmospheric gas introduction layer 100 is a layer made of a ceramic such as porous alumina, and exposed to the reference gas introduction space 98. The reference gas is introduced into the atmospheric gas introduction layer 100 through the reference gas introduction space 98. Further, the atmospheric gas introduction layer 100 is formed so as to cover a reference electrode 102. While imparting a predetermined diffusion resistance to the reference gas inside the reference gas introduction space 98, the atmospheric gas introduction layer 100 introduces the reference gas to the reference electrode 102. Further, the atmospheric gas introduction layer 100 is formed so as to be exposed to the reference gas introduction space 98 only on the rear end side (the right side shown in FIG. 2) of the sensor element 12, which is on the right side of the reference electrode 102. Stated otherwise, the reference gas introduction space 98 is not formed up to a location directly above the reference electrode 102. However, the reference electrode 102 may also be formed directly below the reference gas introduction space 98 shown in FIG. 2.

The reference electrode 102 is an electrode formed so as to be sandwiched between the upper surface of the third substrate layer 64 and the first solid electrolyte layer 66, and as described above, the atmospheric gas introduction layer 100, which is connected to the reference gas introduction space 98, is disposed around the periphery thereof. Moreover, the reference electrode 102 is formed directly on the upper surface of the third substrate layer 64, and a portion thereof other than the portion in contact with the upper surface of the third substrate layer 64 is covered by the atmospheric gas introduction layer 100. Further, as will be discussed later, using the reference electrode 102, it becomes possible to measure the oxygen concentration (oxygen partial pressure) inside the first internal cavity 88, inside the second internal cavity 92, and inside the third internal cavity 96. The reference electrode 102 is formed as a porous cermet electrode (for example, a cermet electrode of Pt and $ZrO_2$).

In the gas-to-be-measured flow through section, the gas introduction port 80 is a portion that opens to the external space, and the gas to be measured is drawn into the sensor element 12 from the external space through the gas introduction port 80. The first diffusion rate control member 82 is a portion that imparts a predetermined diffusion resistance to the gas to be measured which is drawn in from the gas introduction port 80. The buffer space 84 is a space provided in order to guide the gas to be measured that is introduced from the first diffusion rate control member 82, to the second diffusion rate control member 86.

The second diffusion rate control member 86 is a portion that imparts a predetermined diffusion resistance to the gas to be measured which is drawn into the first internal cavity 88 from the buffer space 84. When the gas to be measured is introduced from the exterior of the sensor element 12 into the first internal cavity 88, due to pressure fluctuations of the gas to be measured in the external space (pulsations in the exhaust pressure, in the case that the gas to be measured is an exhaust gas of an automobile), the gas to be measured, which is rapidly drawn into the sensor element 12 from the gas introduction port 80, is not introduced directly into the first internal cavity 88, but rather, is introduced into the first internal cavity 88 after fluctuations in the concentration of the gas to be measured have been canceled by passing through the first diffusion rate control member 82, the buffer space 84, and the second diffusion rate control member 86. Consequently, the fluctuations in the concentration of the gas to be measured that is introduced into the first internal cavity 88 become almost negligible. The first internal cavity 88 is provided as a space for adjusting the oxygen partial pressure within the gas to be measured that is introduced through the second diffusion rate control member 86. The oxygen partial pressure is adjusted by operation of a main pump cell 110 described later.

The main pump cell 110 is an electrochemical pump cell, which is constituted by: an inner side pump electrode 112 disposed on the inner surface of the first internal cavity 88; an outer side pump electrode 114 disposed in a region corresponding to the inner side pump electrode 112, within the upper surface of the second solid electrolyte layer 70 in a manner of being exposed to the external space (the sensor element chamber 28 of FIG. 1); and the second solid electrolyte layer 70 which is sandwiched between the two pump electrodes.

The inner side pump electrode 112 spans over the upper and lower solid electrolyte layers (the second solid electrolyte layer 70 and the first solid electrolyte layer 66) that define the first internal cavity 88, and the spacer layer 68 that serves as the side walls. More specifically, a ceiling electrode portion 112a of the inner side pump electrode 112 is formed on the lower surface of the second solid electrolyte layer 70 that forms a ceiling surface of the first internal cavity 88, a bottom electrode portion 112b is formed directly on the upper surface of the first solid electrolyte layer 66 that forms a bottom surface of the first internal cavity 88, and side electrode portions (not shown) connecting the ceiling electrode portion 112a and the bottom electrode portion 112b are formed on side wall surfaces (inner surfaces) of the spacer layer 68 forming both side wall portions of the first internal cavity 88. Thus, the inner side pump electrode 112 is formed as a structure like a tunnel at the location where the side electrode portions are disposed.

The inner side pump electrode 112 and the outer side pump electrode 114 are formed as porous cermet electrodes (for example, cermet electrodes of $ZrO_2$ and Pt containing 1% of Au). Moreover, the inner side pump electrode 112, which is in contact with the gas to be measured, is formed using a material having a weakened reduction capability for the NOx component within the gas to be measured.

In the main pump cell 110, a desired pump voltage Vp0 is applied between the inner side pump electrode 112 and the outer side pump electrode 114, and a pump current Ip0 is made to flow in a positive direction or a negative direction between the inner side pump electrode 112 and the outer side pump electrode 114, whereby the oxygen inside the first internal cavity 88 can be pumped out to the external space, or the oxygen in the external space can be pumped into the first internal cavity 88.

Further, in order to detect the oxygen concentration (oxygen partial pressure) within the atmosphere inside the first internal cavity 88, an electrochemical sensor cell, and more specifically, an oxygen partial pressure detecting sensor cell 120 for controlling the main pump, is constituted by the inner side pump electrode 112, the second solid electrolyte layer 70, the spacer layer 68, the first solid electrolyte layer 66, and the reference electrode 102.

By measuring an electromotive force V0 in the oxygen partial pressure detecting sensor cell 120 for controlling the main pump, it becomes possible to comprehend and determine the oxygen concentration (oxygen partial pressure) inside the first internal cavity 88. Furthermore, the pump current Ip0 is controlled by feedback-controlling the pump voltage Vp0 of a variable power supply 122 so that the electromotive force V0 becomes constant. Consequently, the oxygen concentration inside the first internal cavity 88 can be maintained at a predetermined constant value.

The third diffusion rate control member 90 is a portion that imparts a predetermined diffusion resistance to the gas to be measured, the oxygen concentration (oxygen partial pressure) of which is controlled by operation of the main pump cell 110 in the first internal cavity 88, and that guides the gas to be measured into the second internal cavity 92.

The second internal cavity 92 is provided as a space in which the gas to be measured, which has undergone oxygen concentration (oxygen partial pressure) adjustment in the first internal cavity 88 beforehand and is then introduced through the third diffusion rate control member 90, is subjected to further oxygen partial pressure adjustment by an auxiliary pump cell 124. As a result, the oxygen concentration inside the second internal cavity 92 can be kept constant with high accuracy, and therefore, in the gas sensor 10, it becomes possible to measure the NOx concentration with high accuracy.

The above-described auxiliary pump cell 124 is an auxiliary electrochemical pump cell, which is constituted by an auxiliary pump electrode 126 provided on an inner surface of the second internal cavity 92, the outer side pump electrode 114 (without being limited to the outer side pump electrode 114, any suitable pump electrode on the outer side of the sensor element 12 is possible), and the second solid electrolyte layer 70.

The auxiliary pump electrode 126 is arranged inside the second internal cavity 92, and has a tunnel-shaped structure similar to that of the inner side pump electrode 112 provided inside the first internal cavity 88. Specifically, a ceiling electrode portion 126a is formed on the second solid electrolyte layer 70 that forms a ceiling surface of the second internal cavity 92, a bottom electrode portion 126b is formed directly on the upper surface of the first solid electrolyte layer 66 that forms a bottom surface of the second internal cavity 92, and side electrode portions (not shown) connecting the ceiling electrode portion 126a and the bottom electrode portion 126b are formed respectively on both wall surfaces of the spacer layer 68 that form the side walls of the second internal cavity 92, thus forming a tunnel-shaped structure. Moreover, in the same manner as the inner side pump electrode 112, the auxiliary pump electrode 126 is also formed using a material having a weakened reduction capability for the NOx component within the gas to be measured.

In the auxiliary pump cell 124, by applying a desired voltage Vp1 between the auxiliary pump electrode 126 and the outer side pump electrode 114, the oxygen within the atmosphere inside the second internal cavity 92 can be pumped out to the external space, or the oxygen can be pumped into the second internal cavity 92 from the external space.

Further, in order to control the oxygen partial pressure within the atmosphere inside the second internal cavity 92, an electrochemical sensor cell, and more specifically, an oxygen partial pressure detecting sensor cell 130 for controlling the auxiliary pump, is constituted by the auxiliary pump electrode 126, the reference electrode 102, the second solid electrolyte layer 70, the spacer layer 68, and the first solid electrolyte layer 66.

Moreover, the auxiliary pump cell 124 carries out pumping by a variable power supply 132, the voltage of which is controlled based on an electromotive force V1 detected by the oxygen partial pressure detecting sensor cell 130 for controlling the auxiliary pump. Consequently, the oxygen partial pressure within the atmosphere inside the second internal cavity 92 is controlled so as to become a low partial pressure that does not substantially influence the measurement of NOx.

In addition, a pump current Ip1 thereof is used to control the electromotive force V0 of the oxygen partial pressure detecting sensor cell 120 for controlling the main pump. More specifically, the pump current Ip1 is input as a control signal to the oxygen partial pressure detecting sensor cell 120 for controlling the main pump to thereby control the electromotive force V0 thereof, whereby the gradient of the oxygen partial pressure within the gas to be measured, which is introduced from the third diffusion rate control member 90 into the second internal cavity 92, is controlled to remain constant at all times. When the gas sensor is used as an NOx sensor, by the actions of the main pump cell 110 and the auxiliary pump cell 124, the oxygen concentration in the second internal cavity 92 is maintained at a constant value on the order of 0.001 ppm.

The fourth diffusion rate control member 94 is a portion that imparts a predetermined diffusion resistance to the gas to be measured, the oxygen concentration (oxygen partial pressure) of which is controlled by operation of the auxiliary pump cell 124 in the second internal cavity 92, and that guides the gas to be measured into the third internal cavity 96. The fourth diffusion rate control member 94 serves to limit the amount of NOx that flows into the third internal cavity 96.

The third internal cavity 96 is provided as a space for performing a process in relation to measurement of the nitrogen oxide (NOx) concentration within the gas to be measured, which has undergone oxygen concentration (oxygen partial pressure) adjustment in the second internal cavity 92 beforehand and is then introduced through the fourth diffusion rate control member 94. Measurement of the NOx concentration is primarily performed by operation of a measurement pump cell 140 in the third internal cavity 96.

The measurement pump cell 140 performs measurement of the NOx concentration in the gas to be measured inside the third internal cavity 96. The measurement pump cell 140 is an electrochemical pump cell constituted by a measurement electrode 134, which is disposed directly on the upper surface of the first solid electrolyte layer 66 facing the third internal cavity 96, the outer side pump electrode 114, the second solid electrolyte layer 70, the spacer layer 68, and the first solid electrolyte layer 66. The measurement electrode 134 is a porous cermet electrode. The measurement electrode 134 also functions as an NOx reduction catalyst for reducing the NOx existing within the atmosphere inside the third internal cavity 96.

In the measurement pump cell 140, it is possible to pump out oxygen that is generated by the decomposition of nitrogen oxide within the atmosphere around the periphery of the measurement electrode 134, and to detect the generated amount thereof as a pump current Ip2.

Further, in order to detect the oxygen partial pressure around the periphery of the measurement electrode 134, an electrochemical sensor cell, and more specifically, an oxygen partial pressure detecting sensor cell 142 for controlling the measurement pump, is constituted by the first solid electrolyte layer 66, the measurement electrode 134, and the reference electrode 102. A variable power supply 144 is controlled based on an electromotive force V2 detected by the oxygen partial pressure detecting sensor cell 142 for controlling the measurement pump.

The gas to be measured which is guided into the second internal cavity 92 reaches the measurement electrode 134 of the third internal cavity 96 through the fourth diffusion rate control member 94, under a condition in which the oxygen partial pressure is controlled. Nitrogen oxide existing within the gas to be measured around the periphery of the measurement electrode 134 is reduced ($2NO \rightarrow N_2 + O_2$) to thereby generate oxygen. Then, such generated oxygen is subjected to pumping by the measurement pump cell 140, and at this time, a voltage Vp2 of the variable power supply 144 is controlled in a manner so that the electromotive force V2 detected by the oxygen partial pressure detecting sensor cell 142 for controlling the measurement pump becomes constant. Since the amount of oxygen generated around the periphery of the measurement electrode 134 is proportional to the concentration of nitrogen oxide within the gas to be measured, the nitrogen oxide concentration within the gas to be measured can be calculated using the pump current Ip2 of the measurement pump cell 140.

Further, an electrochemical sensor cell 146 is constituted by the second solid electrolyte layer 70, the spacer layer 68, the first solid electrolyte layer 66, the third substrate layer 64, the outer side pump electrode 114, and the reference electrode 102, and in accordance with an electromotive force Vref obtained by the sensor cell 146, it is possible to detect the oxygen partial pressure within the gas to be measured existing externally of the sensor.

Furthermore, an electrochemical reference gas adjusting pump cell 150 is constituted by the second solid electrolyte layer 70, the spacer layer 68, the first solid electrolyte layer 66, the third substrate layer 64, the outer side pump electrode 114, and the reference electrode 102. The reference gas adjusting pump cell 150 carries out pumping by distributing a control current Ip3 due to a voltage Vp3 applied by a variable power supply 152, which is connected between the outer side pump electrode 114 and the reference electrode 102. Consequently, the reference gas adjusting pump cell 150 draws in oxygen from the space around the periphery of the outer side pump electrode 114 (the sensor element chamber 28 in FIG. 1) into the space around the periphery of the reference electrode 102 (the atmospheric gas introduction layer 100). The voltage Vp3 of the variable power supply 152 is determined beforehand as a DC voltage, in a manner so that the control current Ip3 becomes a predetermined value (a DC current of a constant value).

In the gas sensor 10 having such a configuration, by operating the main pump cell 110 and the auxiliary pump cell 124, the gas to be measured, in which the oxygen partial pressure is always maintained at a constant low value (a value that does not substantially exert an influence on the measurement of NOx), is supplied to the measurement pump cell 140. Accordingly, it becomes possible for the NOx concentration within the gas to be measured to be known on the basis of the pump current Ip2, which flows by pumping out, by the measurement pump cell 140, the oxygen generated by the reduction of NOx, substantially in proportion to the concentration of NOx within the gas to be measured.

Furthermore, for the purpose of increasing the oxygen ion conductivity of the solid electrolyte, the sensor element 12 is equipped with a heater unit 160 which serves as a temperature adjuster for heating and maintaining the temperature of the sensor element 12. The heater unit 160 includes a heater connector electrode 162, a heater 164, a through hole 166, a heater insulating layer 168, a pressure diffusion hole 170, and a lead wire 172.

The heater connector electrode 162 is an electrode which is formed so as to be in contact with the lower surface of the first substrate layer 60. By the heater connector electrode 162 being connected to an external power supply, it becomes possible for power to be supplied from the exterior to the heater unit 160.

The heater 164 is an electric resistor formed in a state of being sandwiched from above and below between the second substrate layer 62 and the third substrate layer 64. The heater 164 is connected to the heater connector electrode 162 via the lead wire 172 and the through hole 166, and generates heat by being supplied with electrical power from the exterior through the heater connector electrode 162, thereby heating and maintaining the temperature of the solid electrolyte that forms the sensor element 12.

Further, the heater 164 is embedded over the entire region from the first internal cavity 88 to the third internal cavity 96, whereby the sensor element 12 as a whole can be adjusted to a temperature at which the solid electrolyte is activated.

The heater insulating layer 168 is an insulating layer made of porous alumina formed by an insulator of alumina or the like, and is formed on the upper and lower surfaces of the heater 164. The heater insulating layer 168 is formed with the aim of obtaining electrical insulation between the second substrate layer 62 and the heater 164, as well as electrical insulation between the third substrate layer 64 and the heater 164.

The pressure diffusion hole 170 is a portion that is provided so as to penetrate through the third substrate layer 64 and communicate with the reference gas introduction space 98, and is formed with the aim of alleviating an increase in internal pressure accompanying a rise in the temperature inside the heater insulating layer 168.

It should be noted that the variable power supplies 122, 132, 144, and 152, etc., shown in FIG. 2 are actually connected to the respective electrodes via non-illustrated lead wires formed inside the sensor element 12, and the connector 24 and the lead wires 54 shown in FIG. 1.

In addition, in the present embodiment, the terminal members 18 that rearwardly extend are electrically connected to element pads 200 that are exposed from the rear end portion of the sensor element 12. By the ceramic housing 16 being installed around the periphery of the rear end portion of the sensor element 12, and the terminal members 18 being fitted between the above-described element pads 200 (element pads 200a to 200e, refer to FIGS. 3, FIG. 4A, and FIG. 4B) and the ceramic housing 16, the element pads 200 of the sensor element 12 and the terminal members 18 (terminal members 18a to 18d, refer to FIG. 3, FIG. 4A, and FIG. 4B) are pressure fitted and electrically connected. More specifically, the ceramic housing 16 is installed with the terminal members 18 that are electrically connected to the sensor element 12, and retains the rear end portion of the sensor element 12.

The rear portions of the terminal members 18 extend rearwardly of the ceramic housing 16, and are electrically connected by solder or the like to the lead wires 54 that are inserted inside the elastic insulating member 56. In the elastic insulating member 56, a plurality of through holes 202 are formed in the axial direction of the sensor element 12. The lead wires 54 are inserted through the through holes 202, and the terminal members 18, which extend from the sensor element 12, and the lead wires 54 are electrically connected by solder or the like.

Figure 3:
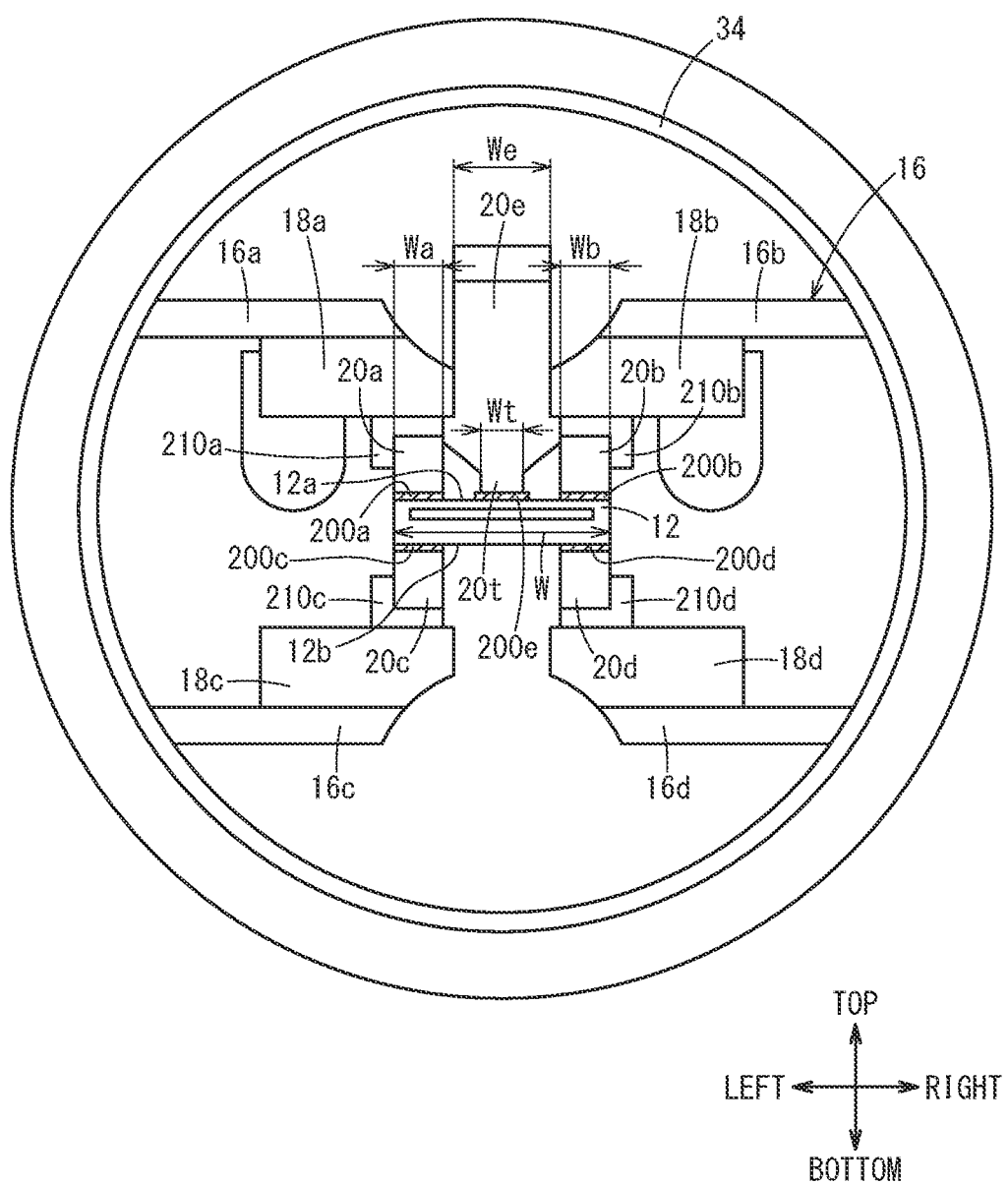
FIG. 3 is a cross-sectional view taken along line III-III in FIG. 1.
Figure 4:
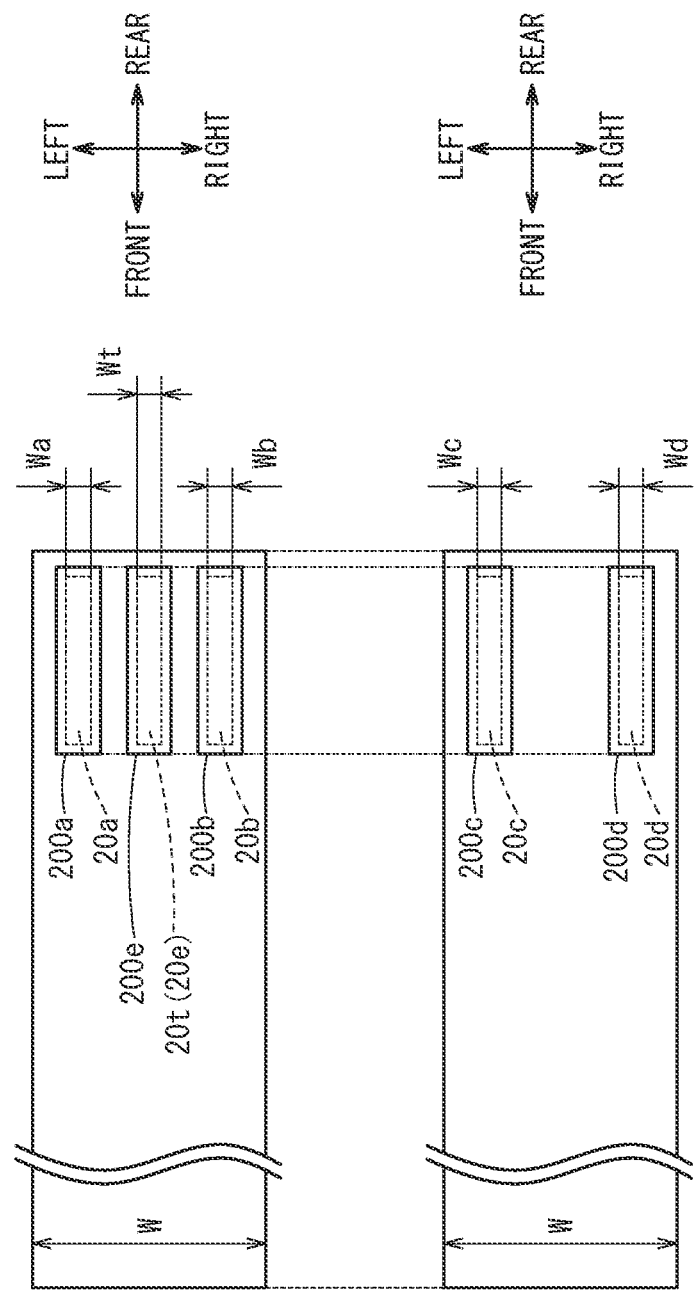
FIG. 4A and FIG. 4B are schematic views showing an arrangement of element pads with respect to the sensor element.

In particular, as shown in FIG. 3, in the gas sensor 10 according to the present embodiment, four terminal members 18a to 18d are disposed on the inner side of the ceramic housing 16 which is provided so as to extend in the front/rear direction inside the outer cylinder 34.

Within the ceramic housing 16, the terminal members 18a and 18b are disposed respectively on two mutually inward facing ceramic pieces 16a and 16b, and the terminal members 18c and 18d are disposed respectively on two other mutually inward facing ceramic pieces 16c and 16d.

The ceramic pieces 16a and 16b, and the ceramic pieces 16c and 16d are disposed to face each other.

Furthermore, within one main surface (a surface facing the terminal member 18c) of the terminal member 18a, at a position facing the element pad 200a that is formed on a main surface 12a (an example of the second surface) of the sensor element 12, a contact-point member 20a is disposed via a positioning layer 210a. Further, within one main surface (a surface facing the terminal member 18d) of the terminal member 18*b*, at a position facing the element pad 200*b* that is formed on the main surface 12*a* (an example of the second surface) of the sensor element 12, a contact-point member 20*b* is disposed via a positioning layer 210*b*.

Furthermore, within one main surface (a surface facing the terminal member 18*a*) of the terminal member 18*c*, at a position facing the element pad 200*c* that is formed, for example, on the left side of a main surface 12*b* (an example of the first surface) of the sensor element 12, a contact-point member 20*c* is disposed via a positioning layer 210*c*, and within one main surface (a surface facing the terminal member 18*b*) of the terminal member 18*d*, at a position facing the element pad 200*d* that is formed on the main surface 12*b* (an example of the first surface) of the sensor element 12, a contact-point member 20*d* is disposed via a positioning layer 210*d*.

Further, a contact-point member 20*e* is disposed between the terminal member 18*a* and the terminal member 18*b*. A width We of the contact-point member 20*e* is roughly two times a width (Wa, Wb, etc.) of the contact-point members 20*a* and the like, except for a width Wt of a distal end portion 20*t* thereof. Conversely, the width Wt of the distal end portion 20*t* is formed to be narrower than the width (Wa, Wb, etc.) of the contact-point members 20*a* and the like. The contact-point member 20*e* is positioned so that the distal end portion 20*t* thereof faces the element pad 200*e* that is formed on the one main surface of the sensor element 12.

In the foregoing manner, three contact-point members 20*a*, 20*b*, and 20*e* (the plurality of second contact-point members) are disposed on the main surface 12*a* (the second surface) of the sensor element 12, and two contact-point members 20*c* and 20*d* (a plurality of first contact-point members) are disposed on the main surface 12*b* (the first surface) of the sensor element 12. The contact-point members 20*a*, 20*b*, and 20*e*, and the contact-point members 20*c* and 20*d* are electrically and mechanically connected, respectively, to the element pads 200*a*, 200*b*, and 200*e* (a plurality of second element pads), and the element pads 200*c* and 200*d* (a plurality of first element pads), and are electrically connected to the sensor element 12 and cooperatively serve to retain the sensor element 12.

In this manner, in the case that the number of the contact-point members 20 on the upper and lower sides of the sensor element 12 differ, it is preferable that the width of at least one (in this instance, the contact-point member 20*e*) of the contact-point members 20 (the plurality of second contact-point members) on the side with the larger number is smaller than the width of the other ones of the contact-point members 20. Such a feature serves to make the stresses applied from the contact-point members 20 to the sensor element 12 uniform on the upper and lower sides.

Further, it is preferable for the contact-point member (in this instance, the contact-point member 20*e*) having a smaller width not to be arranged at the end of the contact-point members 20 on the side having the larger number of the contact-point members. When the contact-point member having a smaller width is arranged at the end of a row of the contact-point members, concentration of stresses at that location is facilitated. In this instance, among the three contact-point members 20*a*, 20*b*, and 20*e* that are arranged alongside one another, the width Wt (of the distal end portion 20*t*) of the central contact-point member 20*e* is made smaller than the width of the other contact-point members 20*a* to 20*d*.

As shown in an example to be described later, a ratio R1 (=Wt/Wa, etc.) of the width Wt of the distal end portion 20*t* of the central contact-point member 20*e* to the width (Wa, Wb, etc.) of the contact-point members (the contact-point members 20*a* and the like) on the outer sides is preferably greater than or equal to 40% and less than or equal to 90% (65±25%). Further, a ratio R2 (=Wt/W) of the width Wt of the distal end portion 20*t* of the contact-point member 20*e* to a width W of the sensor element 12 is preferably greater than or equal to 12.1% and less than or equal to 27.3%.

Figure 5:
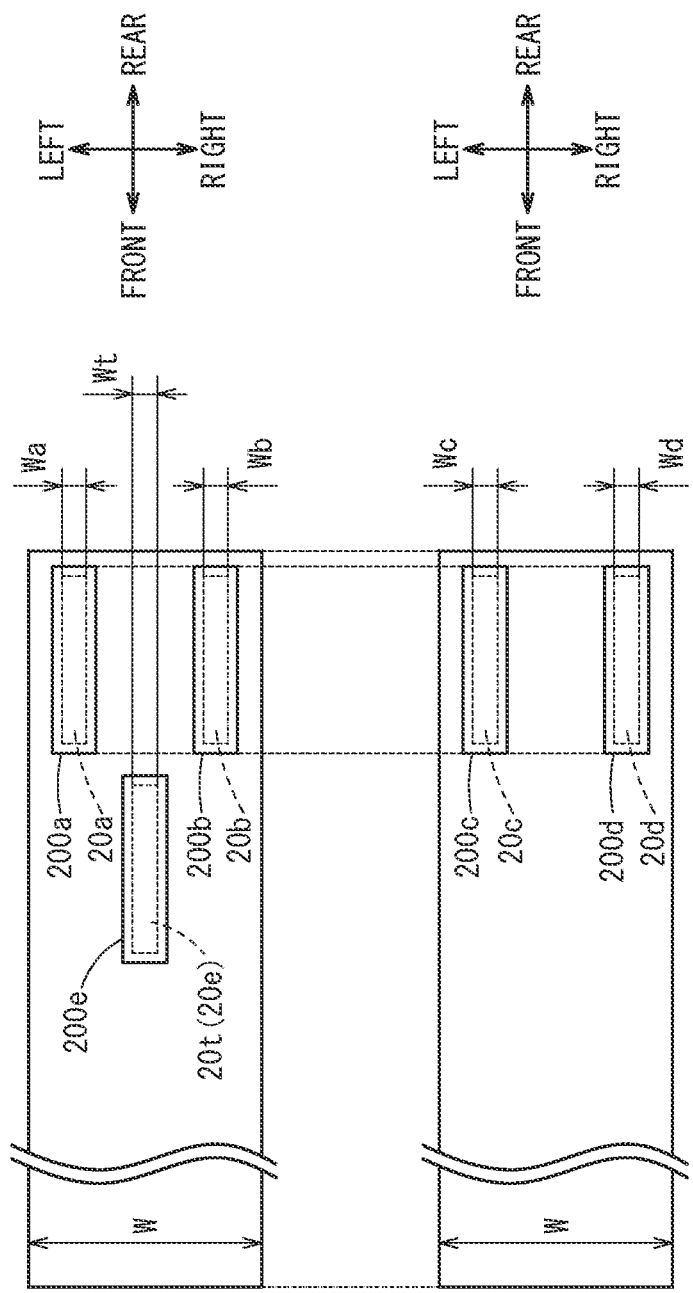
FIG. 5A and FIG. 5B are schematic views showing an arrangement of the element pads with respect to the sensor element.
Figure 6:
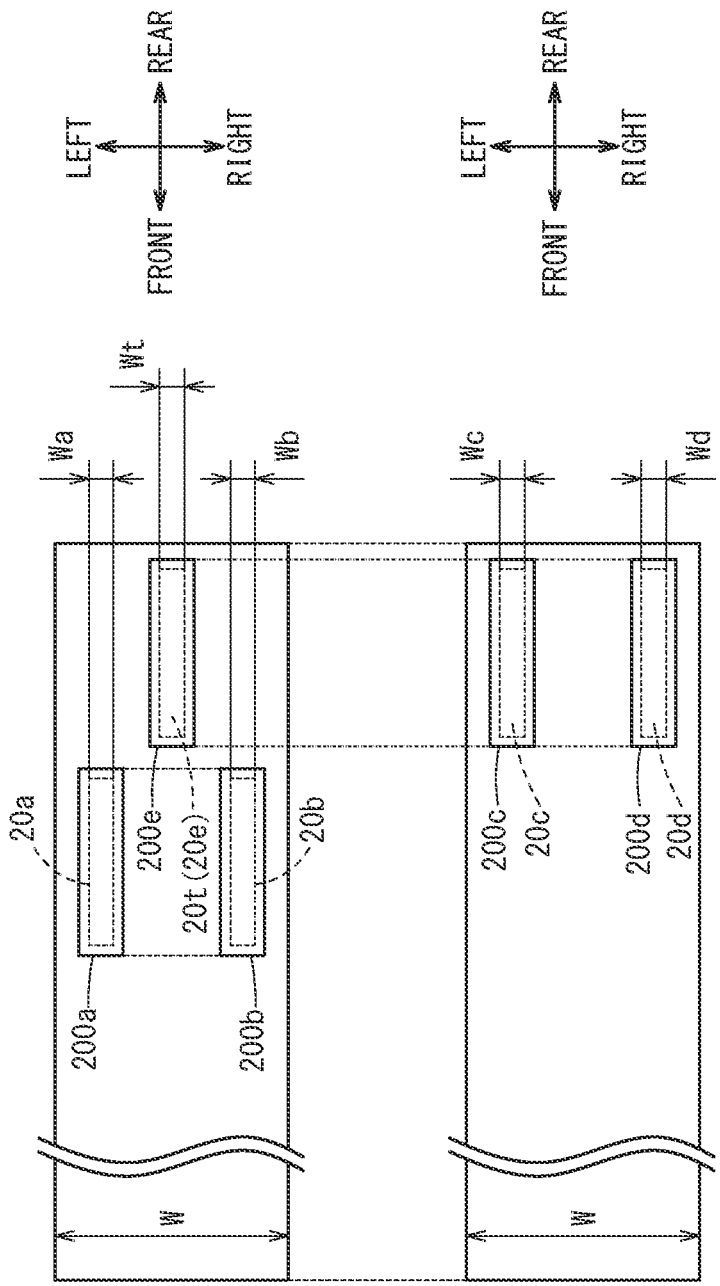
FIG. 6A and FIG. 6B are schematic views showing an arrangement of the element pads with respect to the sensor element.

FIG. 5A and FIG. 5B are schematic views showing an arrangement of the element pads 200 (the contact-point members 20) with respect to the sensor element 12 of a gas sensor 10 according to a modification. In FIG. 5A, the element pad 200*e* (the contact-point member 20*e*) is arranged so as to be shifted in the frontward direction from the element pads 200*a* and 200*b* (the contact-point members 20*a* and 20*b*). FIG. 6A and FIG. 6B are schematic views showing an arrangement of the element pads 200 (the contact-point members 20) with respect to the sensor element 12 of a gas sensor 10 according to a modification. In FIG. 6A, the element pads 200*a* and 200*b* (the contact-point members 20*a* and 20*b*) are arranged so as to be shifted in the frontward direction from the element pad 200*e* (the contact-point member 20*e*). In this manner, by shifting at least one of the contact-point members 20 (the element pads 200) in a frontward or rearward direction from the other ones of the contact-point members 20 (the element pads 200), concentration of stresses on the sensor element 12 can be avoided.

In this instance, the contact-point member 20*e* having a comparatively small width is shifted in a frontward or rearward direction from the contact-point members 20*a* and 20*b*. As a result, concentration of stresses can be alleviated more effectively due to both the small width Wt of the contact-point member 20*e* and the shifting in position of the contact-point member 20*e*.

At this time, as shown in FIGS. 5A and 5B, the contact-point members 20*c* and 20*d* on the lower side can be located at positions corresponding to the contact-point members 20*a* and 20*b*. Further, as shown in FIGS. 6A and 6B, the upper contact-point members 20*a* and 20*b* may be shifted from the lower contact-point members 20*c* and 20*d*. More specifically, so long as the contact-point member 20*e* is shifted from the contact-point members 20*a* and 20*b* on the same surface, the concentration of stresses on at least that surface can be alleviated.

EXAMPLE

In this instance, an experimental example is shown. In this experiment, gas sensors were prepared in which the widths Wt of the contact-point member 20*e* and the presence or absence of shifting in position thereof were different, and in a heating and vibration test, checks were performed as to the presence or absence of chipping, breakage, and conductivity of the sensor element 12.

The heating and vibration test was performed under the following conditions, in a state with the gas sensor being mounted on an exhaust pipe of a propane burner installed in a vibration testing machine.

Gas Temperature: 900° C.
Vibration Conditions: Sweeping for 30 minutes through 50 Hz→100 Hz→150 Hz→250 Hz
Acceleration: 30 G, 40 G, 50 G
Test Time: 150 hours
[Determination Method]
Determination: After completion of the vibration test, checks as to the presence or absence of chipping, breakage, and conductivity of the sensor element 12 are performed.

A: lack of chipping, lack of breakage, and presence of conductivity in the sensor element 12

B: presence of chipping, lack of breakage, and presence of conductivity in the sensor element 12

C: presence of either chipping or breakage, and lack of conductivity in the sensor element 12

As indicated above, in Evaluation A, there was no evidence of chipping, breakage, or poor conductivity, and after completion of the test, there was no evidence of an abnormality in the sensor element 12. In Evaluation B, although chipping occurred in the sensor element 12, such chipping did not lead to poor conductivity. In Evaluation C, either chipping or breakage occurred in the sensor element 12, which led to poor conductivity.

The ratio R1 (=Wt/Wa, etc.) of the width Wt of the distal end portion 20*t* of the contact-point member 20*e* to the width (Wa, Wb, etc.) of the contact-point members (the contact-point members 20*a* and the like) on the outer side in each of levels 1 through 10 was 100%, 90%, 80%, 70%, 60%, 50%, 45%, 40%, 35%, and 30%. At this time, the ratio R2 (=Wt/W) of the width Wt of the distal end portion 20*t* of the contact-point member 20*e* to the width W of the sensor element 12 was 30.3%, 27.3%, 24.2%, 21.2%, 18.2%, 15.2%, 13.6%, 12.1%, 10.6%, and 9.1%.

Moreover, the width of the contact-point members (the contact-point members 20*a* and the like) on the outer side is 1 mm, and the width of the sensor element 12 is 3.3 mm. Further, in FIG. 7, the contact-point member 20*e* is not shifted from the contact-point members (the contact-point members 20*a* and the like) on the outer side (refer to FIG. 4A), whereas in FIG. 8, the contact-point member 20*e* is shifted in the frontward direction from the contact-point members (the contact-point members 20*a* and the like) on the outer side (refer to FIG. 5A).

The determination results for these levels 1 through 10 including a breakdown of items are shown in Table 1 and Table 2 of FIGS. 7 and 8. As shown in Table 1 of FIG. 7, in the case that the contact-point member 20*e* is not shifted, the ratio R1 is preferably greater than or equal to 40% and less than or equal to 90% (the ratio R2 (=Wt/W) is greater than or equal to 12.1% and less than or equal to 27.3%), and more preferably, is greater than or equal to 50% and less than or equal to 70% (the ratio R2 is greater than or equal to 15.2% and less than or equal to 21.2%).

When the ratio R1 was less than or equal to 35%, the sensor element 12 became chipped in the vicinity of the contact-point member 20*e*, which resulted in poor conductivity. It may be considered that the contact area between the sensor element 12 and the contact-point member 20*e* became smaller, and concentration of stresses were caused at this location. On the other hand, when the ratio R1 was greater than or equal to 100%, chipping occurred in the sensor element 12 between the contact-point member 20*e* and the contact-point member 20*a* or 20*b*, which resulted in poor conductivity. It may be considered that the contact area between the sensor element 12 and the upper contact-point member became large (the difference in stresses between the upper and lower surfaces became large), which resulted in damage occurring on the upper side where the stress was large.

As shown in Table 2 of FIG. 8, in the case that the contact-point member 20*e* is shifted, the ratio R1 is preferably greater than or equal to 35% and less than or equal to 90% (the ratio R2 (=Wt/W) is greater than or equal to 10.6% and less than or equal to 27.3%), and more preferably, is greater than or equal to 40% and less than or equal to 90% (the ratio R2 is greater than or equal to 12.1% and less than or equal to It should be noted that similar results were obtained also in the case that, as shown in FIGS. 6A and 6B, the contact-point members 20 (the contact-point members 20*a* and the like) on the outer side were shifted in the frontward direction.

In this manner, in addition to reducing the width Wt, by shifting the position of the contact-point members 20, damage to the sensor element 12 can be further reduced. In particular, in the case that shifting in position is not performed, the evaluation A was brought about for the ratio R1 within a range of from 50% to 70%, whereas in the case that shifting in position is performed, the evaluation A was brought about for the ratio R1 in an expanded range of from 40% to 90%.

As indicated above, the width of at least one of the contact-point members 20 on the side having a larger number of terminals (in this instance, the main surface 12*a* side) is made smaller than the width of the other ones of the contact-point members 20, whereby a balance can be maintained between the stresses applied to the sensor element 12, and damage (chipping or breakage and the like of the sensor element 12) can be prevented.

In this instance, three terminals are arranged on the main surface 12*a* side, and two terminals are arranged on the main surface 12*b* side, and by making the width of the central one of the three terminals smaller than the width of the other terminals, concentration of stresses at the center of the three terminals is reduced. In addition, by shifting the central terminal from the two terminals on the outer side (by arranging the terminals apart from each other), concentration of stresses can be further prevented, and the reliability of the contact-points can be further increased.

[Invention Obtained from the Present Embodiment]

A description will be given below concerning the invention that can be grasped from the above-described embodiment.

[1] The gas sensor (10) according to the present embodiment is equipped with the sensor element (12), the plurality of first element pads (200*c* and 200*d*), the plurality of second element pads (200*a*, 200*b*, and 200*e*), the plurality of first contact-point members (20*c* and 20*d*), and the plurality of second contact-point members (20*a*, 20*b*, and 20*e*). The sensor element includes the first and second surfaces (12*b*, 12*a*) that face each other in the first direction. The plurality of first element pads are arranged on the first surface of the sensor element. The plurality of second element pads are arranged on the second surface of the sensor element, and are greater in number than the plurality of first element pads. The plurality of first contact-point members are connected respectively to the plurality of first element pads. The plurality of second contact-point members are connected respectively to the plurality of second element pads, and are greater in number than the plurality of first contact-point members. The width (Wt) of at least one second contact-point member among the plurality of second contact-point members is smaller than the width (Wa to Wd) of the other ones of the first and second contact-point members.

In accordance with these features, uniformity is achieved in the stresses applied respectively from the contact-point members to the first surface and the second surface of the sensor element, and it is possible to prevent chipping and breakage of the sensor element caused by non-uniformity of the stresses, and to prevent poor conductivity between the sensor element and the contact-point members.

[2] In the present embodiment, the number of the plurality of second contact-point members is greater than or equal to three, and the at least one second contact-point member is not arranged at the end of the plurality of second contact-point members.

By not arranging the at least one second contact-point member at the end of the plurality of second contact-point members, uniformity of stresses in the vicinity of the center of the plurality of second contact-point members can be achieved.

[3] In the present embodiment, the ratio of the width of the at least one second contact-point member to the width of the other ones of the first and second contact-point members is 40% to 90%. When the ratio is less than or equal to 40%, the contact area between the sensor element and the contact-point members becomes small, the stresses become concentrated, and chipping of the sensor element is likely to occur. When the ratio exceeds 90%, the difference in the stresses between the first and second surfaces of the sensor element is likely to become large.

[4] In the present embodiment, the ratio of the width (Wt) of the at least one second contact-point member to the width (W) of the sensor element is 12.1% to 27.3%. When the ratio is less than or equal to 12.1%, the contact area between the sensor element and the contact-point members becomes small, the stresses become concentrated, and chipping of the sensor element is likely to occur. When the ratio exceeds 27.3%, the difference in the stresses between the first and second surfaces of the sensor element is likely to become large.

[5] In the present embodiment, the at least one second contact-point member is arranged so as to be shifted from the other ones of the second contact-point members. In accordance with this feature, it is possible to disperse the stresses on the second surface.

[6] In the present embodiment, the sensor element extends in the second direction which differs from the first direction, the plurality of second contact-point members are arranged alongside one another in the third direction that differs from the first direction and the second direction, and the at least one second contact-point member is arranged so as to be shifted in the second direction from the other ones of the second contact-point members. By shifting the at least one second contact-point member from the other ones of the second-contact point members in the second direction, which differs from the third direction in which the plurality of second contact-point members are arranged alongside one another, it is possible to more effectively disperse the stresses on the second surface.

In practicing the present invention, various configurations for improving reliability may be added as components for an automotive vehicle to such an extent that the concept of the present invention is not impaired.

The invention claimed is:

1. A gas sensor, comprising:
   a sensor element having a first surface and a second surface configured to face each other in a first direction;
   a plurality of first element pads arranged on the first surface of the sensor element;
   a plurality of second element pads that are arranged on the second surface of the sensor element, and are greater in number than the plurality of first element pads;
   a plurality of first contact-point members connected respectively to the plurality of first element pads; and
   a plurality of second contact-point members that are connected respectively to the plurality of second element pads, and are greater in number than the plurality of first contact-point members,
   wherein a width of a distal end of at least one second contact-point member among the plurality of second contact-point members is smaller than a width of a distal end of other ones of the first and second contact-point members,
   a number of the plurality of second contact-point members is greater than or equal to three, and the at least one second contact-point member is not arranged at an end of the plurality of second contact-point members,
   a ratio of the width of the distal end of the at least one second contact-point member to the width of the distal end of the other ones of the second contact-point members is 40%90%, and
   a ratio of the width of the at least one second contact-point member to a width of the sensor element is 12.1% to 27.3%,
   wherein the at least one second contact-point member is arranged so as to be shifted from the other ones of the second contact-point members.

2. The gas sensor according to claim 1, wherein:
   the sensor element extends in a second direction that differs from the first direction;
   the plurality of second contact-point members are arranged alongside one another in a third direction that differs from the first direction and the second direction; and
   the at least one second contact-point member is arranged so as to be shifted in the second direction from the other ones of the second contact-point members.

3. The gas sensor according to claim 1, wherein the ratio of the width of the distal end of the at least one second contact-point member to the width of the other ones of the second contact-point members is 50% to 70%.

4. The gas sensor according to claim 1, wherein the ratio of the width of the distal end of the at least one second contact-point member to the width of the sensor element is 15.2% to 21.2%.

* * * * *

UNITED STATES PATENT AND TRADEMARK OFFICE
CERTIFICATE OF CORRECTION

PATENT NO. : 12,153,011 B2
APPLICATION NO. : 17/882889
DATED : November 26, 2024
INVENTOR(S) : S. Niizuma et al.

It is certified that error appears in the above-identified patent and that said Letters Patent is hereby corrected as shown below:

In the Claims

Column 16, Line 28, Claim 1, delete "40%90%" and insert --40% to 90%--.

Signed and Sealed this
Eleventh Day of February, 2025

Coke Morgan Stewart
*Acting Director of the United States Patent and Trademark Office*